United States Patent
Yoshida (10) Patent No.: US 9,871,395 B2
(45) Date of Patent: Jan. 16, 2018

(54) CHARGING CONTROL DEVICE

(71) Applicant: Ken Yoshida, Miyoshi (JP)

(72) Inventor: Ken Yoshida, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/102,466

(22) PCT Filed: Feb. 10, 2015

(86) PCT No.: PCT/JP2015/053589
§ 371 (c)(1),
(2) Date: Jun. 7, 2016

(87) PCT Pub. No.: WO2015/125657
PCT Pub. Date: Aug. 27, 2015

(65) Prior Publication Data
US 2016/0352107 A1    Dec. 1, 2016

(30) Foreign Application Priority Data

Feb. 19, 2014 (JP) .................................. 2014-030059

(51) Int. Cl.
*H02J 7/00* (2006.01)
*H02J 7/14* (2006.01)

(52) U.S. Cl.
CPC ............ *H02J 7/007* (2013.01); *H02J 7/0029* (2013.01); *H02J 7/0077* (2013.01); *H02J 7/14* (2013.01);
(Continued)

(58) Field of Classification Search
CPC .. H02J 7/007; H02J 7/0029; H02J 7/14; H02J 2007/005; Y02T 10/92
(Continued)

(56) References Cited

U.S. PATENT DOCUMENTS

2006/0152195 A1* 7/2006 Ishishita ............ G01R 31/3651
320/132
2009/0051322 A1* 2/2009 Kubota .................... B60K 6/46
320/134

FOREIGN PATENT DOCUMENTS

EP          2472278 A1      7/2012
JP          S5336646 A      4/1978
(Continued)

OTHER PUBLICATIONS

Mar. 7, 2017 Office Action issued in Japanese Patent Application No. 2014-030059.

*Primary Examiner* — Edward Tso
*Assistant Examiner* — Aaron Piggush
(74) *Attorney, Agent, or Firm* — Oliff PLC (57) ABSTRACT

A charging control device that executes charge control appropriately without reducing effects of charge control, and is configured to include a charged state calculation unit configured to calculate remaining capacity of battery that can be charged and discharged, based on signal from a sensor to detect state of the battery; an accumulated charge and discharge calculation unit configured to calculate an accumulated amount of charge and discharge of the battery after activation of the battery, based on the signal from the sensor; an execution determination unit configured, in a case where remaining capacity calculated by charged state calculation unit is less than first threshold, to determine whether to execute charge control to recover remaining capacity of the battery, based on accumulated amount calculated by accumulated charge and discharge calculation unit; and charge control unit configured to execute charge control following determination result by execution determination unit.

8 Claims, 4 Drawing Sheets

(52) U.S. Cl.
CPC ....... *H02J 7/1446* (2013.01); *H02J 2007/004* (2013.01); *H02J 2007/005* (2013.01); *Y02T 10/92* (2013.01)

(58) Field of Classification Search
USPC .................................. 320/107, 132, 134, 162
See application file for complete search history.

(56) References Cited

FOREIGN PATENT DOCUMENTS

| | | |
|---|---|---|
| JP | H09-037481 A | 2/1997 |
| JP | 2001-157307 A | 6/2001 |
| JP | 2003-164073 A | 6/2003 |
| JP | 2004-060526 A | 2/2004 |
| JP | 2009-201197 A | 9/2009 |
| JP | 2012-058088 A | 3/2012 |
| JP | 2012-221744 A | 11/2012 |
| JP | 2012-222895 A | 11/2012 |
| WO | 2010/140044 A1 | 12/2010 |

* cited by examiner

CHARGING CONTROL DEVICE

TECHNICAL FIELD

The present invention relates to a charging control device, especially relates to a charging control device that is suitable for charging a battery that can be charged and discharged, when the charged state of the battery becomes low.

BACKGROUND ART

Conventionally, a device has been known that detects the charged state of a battery that is installed in a vehicle or the like, and can be charged and discharged (see, for example, Patent Document 1). The device described in this Patent Document 1 detects a relative charged state by applying time-accumulation to charge and discharge currents detected by a current sensor, or an absolute charged state as the remaining capacity of the battery, based on the charge and discharge currents detected by the current sensor and voltage values. Then, the device executes charge control to charge the battery, by controlling the amount of power generation based on the detected charged states.

RELATED-ART DOCUMENTS

Patent Documents

[Patent Document 1] Japanese Laid-open Patent Publication No. 2001-157307

SUMMARY OF THE INVENTION

Problem to be Solved by Invention

The charge control to charge the battery described above controls the amount of power generation based on the charged states of the battery. Therefore, the charge control can reduce the amount of power generation that consumes fuel (the amount of the power generated by the fuel), which in turn improves the fuel efficiency of the vehicle, and secures a longer battery life.

Incidentally, when the absolute charged state of the battery is low, namely, when the remaining capacity of the battery is less than a predetermined threshold, the charge control may be executed to charge the battery. However, if the charge control is executed uniformly just because the remaining capacity of the battery has become less than the predetermined threshold, regardless of the charge and discharge of the battery being balanced relatively or in a short-term, the charge control places a high load on the vehicle engine, and hence, the effect of improving the vehicle fuel efficiency by the charge control may be reduced.

In view of the above, it is a general object of at least one embodiment of the present invention to provide a charging control device that can execute charge control appropriately, without reducing the effects of the charge control.

Means to Solve the Problem

The object is achieved by a charging control device that includes a charged state calculation unit configured to calculate a remaining capacity of a battery that can be charged and discharged, based on a signal from a sensor to detect a state of the battery; an accumulated charge and discharge calculation unit configured to calculate an accumulated amount of charge and discharge of the battery after an activation of the battery, based on the signal from the sensor; an execution determination unit configured, in a case where the remaining capacity calculated by the charged state calculation unit is less than a first threshold, to determine whether to execute charge control to recover the remaining capacity of the battery, based on the accumulated amount calculated by the accumulated charge and discharge calculation unit; and a charge control unit configured to execute the charge control following a determination result by the execution determination unit.

Advantage of the Invention

According to an embodiment of the present invention, a charging control device can execute charge control appropriately, without reducing the effect of the charge control.

MODE FOR CARRYING OUT THE INVENTION

In the following, specific embodiments of a charging control device will be described with reference to the drawings according to the present invention.

Figure 1:
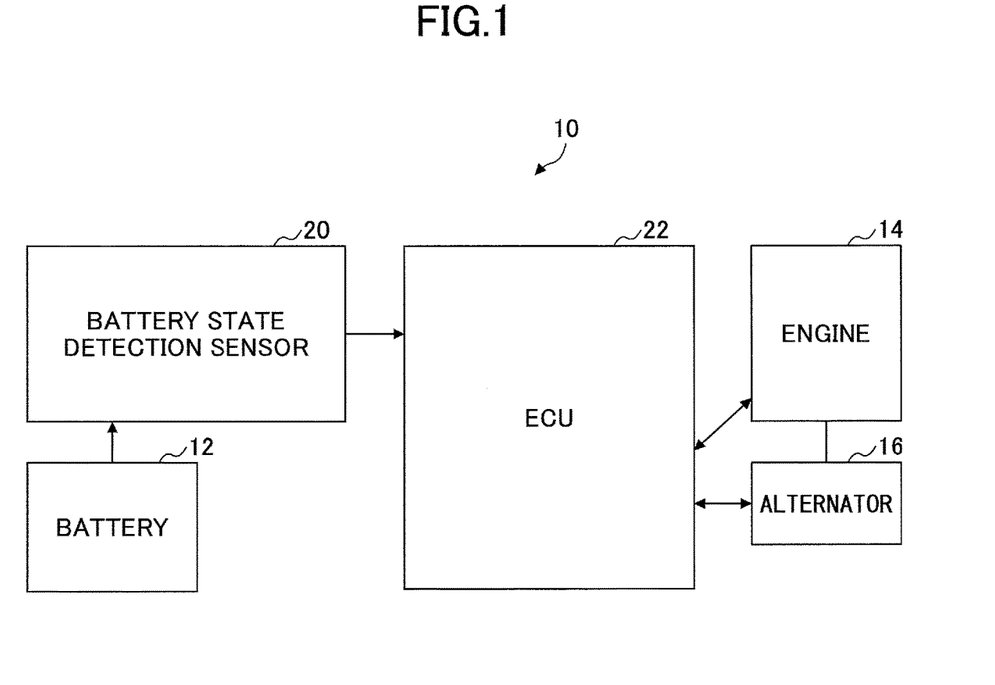
FIG. 1 is a configuration diagram of a system that includes a charging control device according to an embodiment of the present invention.
Figure 2:
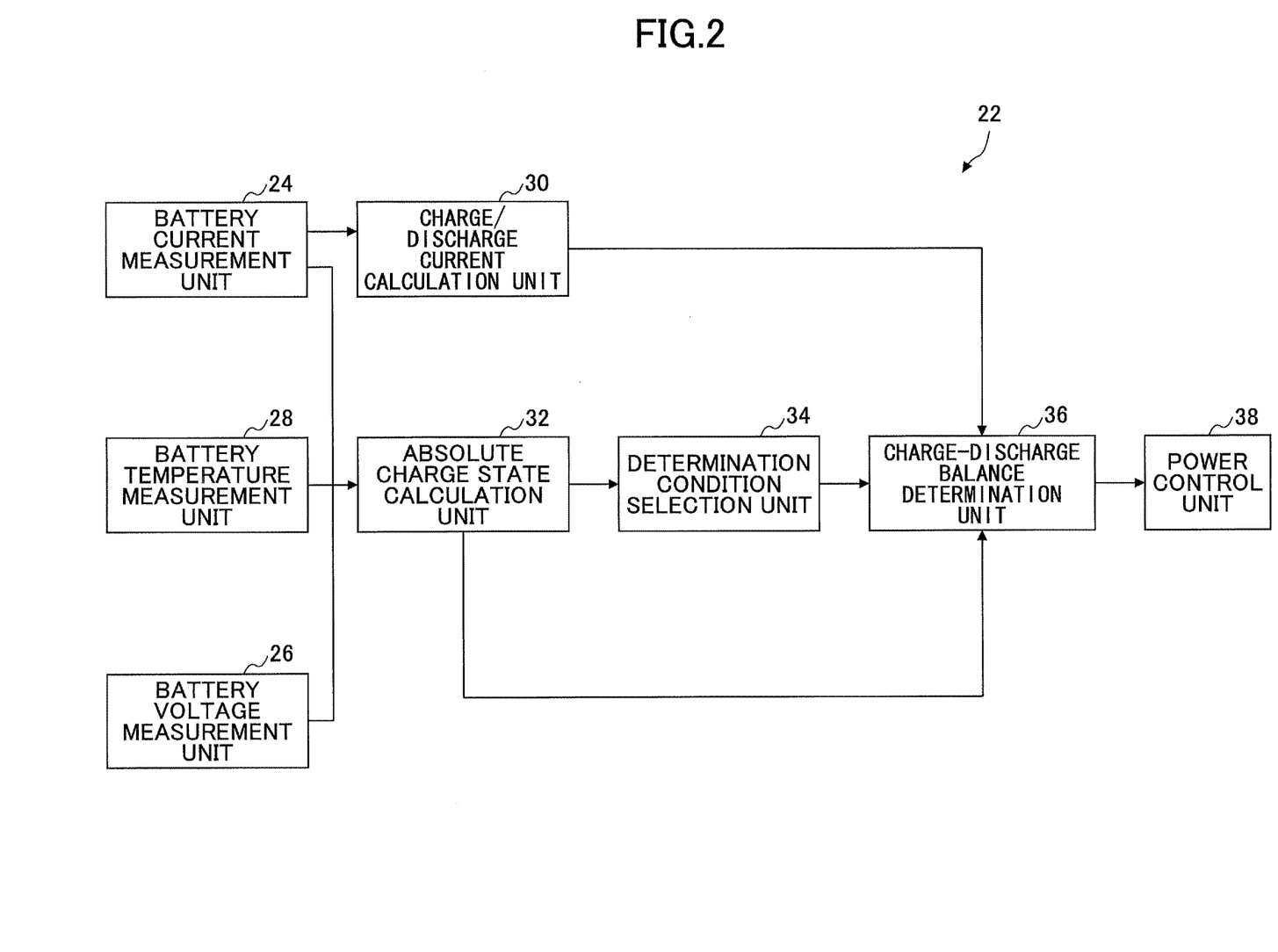
FIG. 2 is a block configuration diagram of the charging control device according to the embodiment.

FIG. 1 is a configuration diagram of a system that includes a charging control device 10 according to an embodiment of the present invention. Also, FIG. 2 is a block configuration diagram of the charging control device 10 according to the embodiment.

The system in the embodiment is an in-vehicle system installed in a vehicle. In the embodiment, the vehicle includes a battery 12, an engine 14, and an alternator 16. The battery 12 is a battery that can be charged and discharged, supplies accumulated electric power to external in-vehicle electric devices, and accumulates electric power supplied by the alternator 16. The battery 12 has a predetermined capacity to be capable of accumulating a predetermined amount of electric power. The engine 14 generates motive power by receiving fuel supply, which is mainly used for driving the vehicle. Also, the alternator 16 is connected with the engine 14 mechanically, and can generate electric power when the engine 14 is put into operation. Furthermore, the alternator 16 is connected with the battery 12 via a power cable, and can supply generated power to the battery 12.

The charging control device 10 includes sensors 20 to detect states of the battery 12. The sensors 20 include a battery current sensor, a battery voltage sensor, and a battery temperature sensor. The battery current sensor is a sensor to output a signal that corresponds to charge and discharge currents (namely, a battery current(s)) I of the battery 12, specifically, a signal that corresponds to an instantaneous value of a current (a charge current) flowing into the battery 12, and a current (a discharge current) flowing out of the battery 12. The battery voltage sensor is a sensor to output a signal that corresponds to a voltage value (battery voltage) V generated between both terminals of the battery 12. Also, the battery temperature sensor is a sensor to output a signal that corresponds to the temperature of the battery 12, or an atmospheric temperature T around the battery 12.

The charging control device 10 also includes an electronic control unit (referred to as an "ECU" below) 22 mainly constituted with a microcomputer. The output of the sensors 20 is supplied to the ECU 22. The ECU 22 includes a battery current measurement unit 24, a battery voltage measurement unit 26, and a battery temperature measurement unit 28 that respectively detect the charge and discharge current I, the battery voltage V, and the battery temperature T, based on the signals supplied as input from the sensors 20. The ECU 22 detects various states of the battery 12, based on the charge and discharge current I, the battery voltage V, and the battery temperature T of the battery 12 detected as described above.

Specifically, the ECU 22 includes a charge/discharge current calculation unit 30 and an absolute charged state calculation unit 32. The charge/discharge current calculation unit 30 is a part to calculate an amount of accumulation ΣI, which is a time-accumulated amount of charge and discharge currents of the battery 12 detected by using the sensors 20 during a trip since the vehicle has been started (namely, the engine 14 has been started). The absolute charged state calculation unit 32 is a part to calculate an absolute capacity (namely, the remaining capacity of the battery) C of the battery 12 at a current timing, based on the charge and discharge current I, the battery voltage V, and the battery temperature T of the battery 12 detected by using the sensors 20, with reference to a predetermined map.

The ECU 22 also includes a determination condition selection unit 34, a charge-discharge balance determination unit 36, and a power control unit 38. The determination condition selection unit 34 is a part to select a condition to be used by the charge-discharge balance determination unit 36 when determining whether the charge and discharge of the battery 12 are balanced. The charge-discharge balance determination unit 36 is a part to determine whether the charge and discharge of the battery 12 are balanced. Note that the balance between the charge and discharge may include both a relative (short-term) balance and an absolute (long-term) balance.

Also, the power control unit 38 is a part electrically connected with the engine 14 and the alternator 16, to execute power control of the vehicle by using the engine 14 and the alternator 16; specifically, to execute charge control to charge the battery 12 if the charge-discharge balance determination unit 36 determines that the balance between the charge and discharge of the battery 12 is excessively discharged. This charge control is to recover the remaining capacity of the battery 12, by increasing the rotational speed of the engine 14, or raising the power generation voltage of the alternator 16. The objectives of the charge control are to improve the vehicle fuel efficiency by reducing the fuel consumption amount consumed by the engine 14, and to secure a longer battery life.

Figure 3:
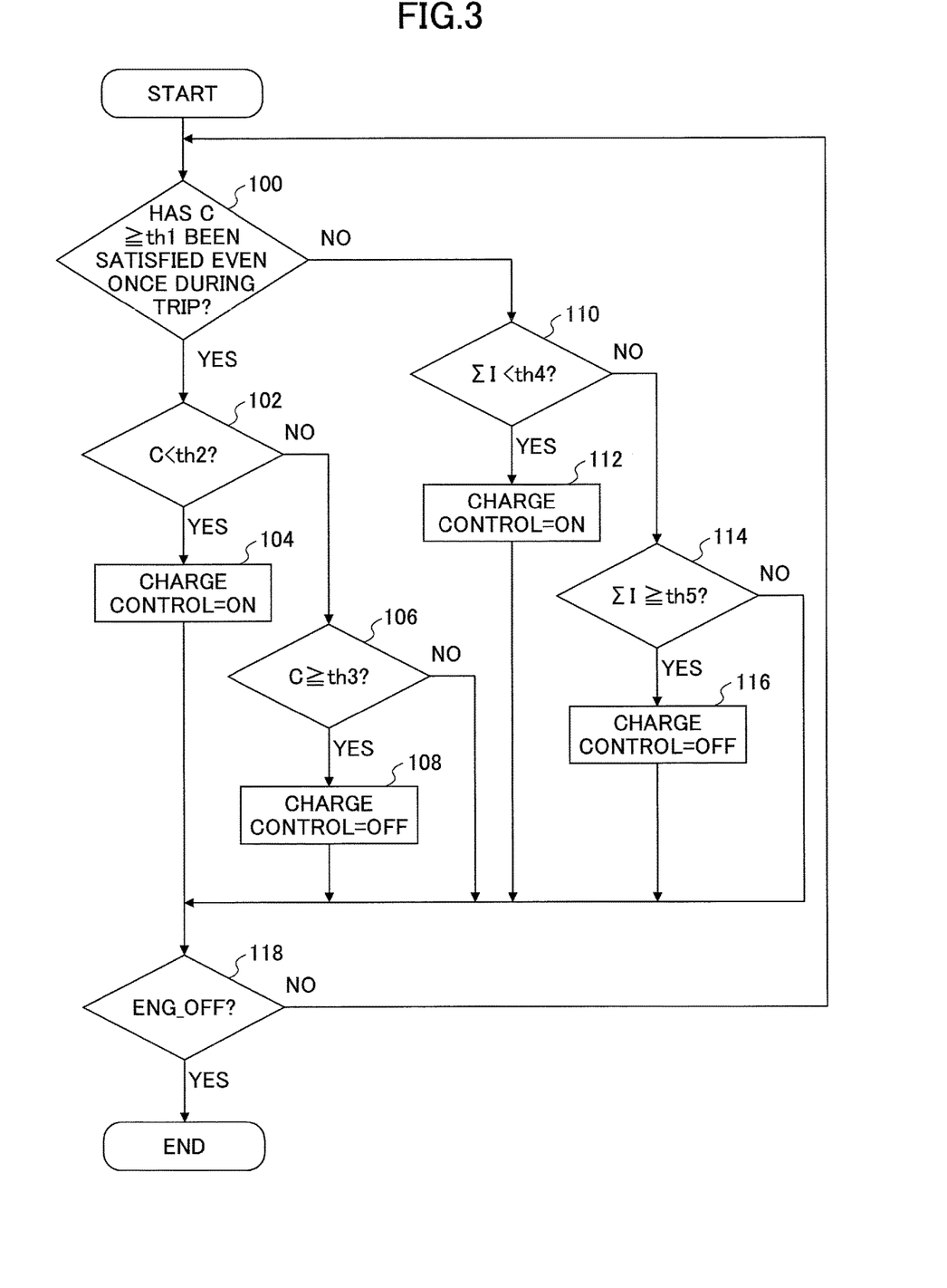
FIG. 3 is an example of a flowchart of a control routine executed in the charging control device according to the embodiment.
Figure 4A:
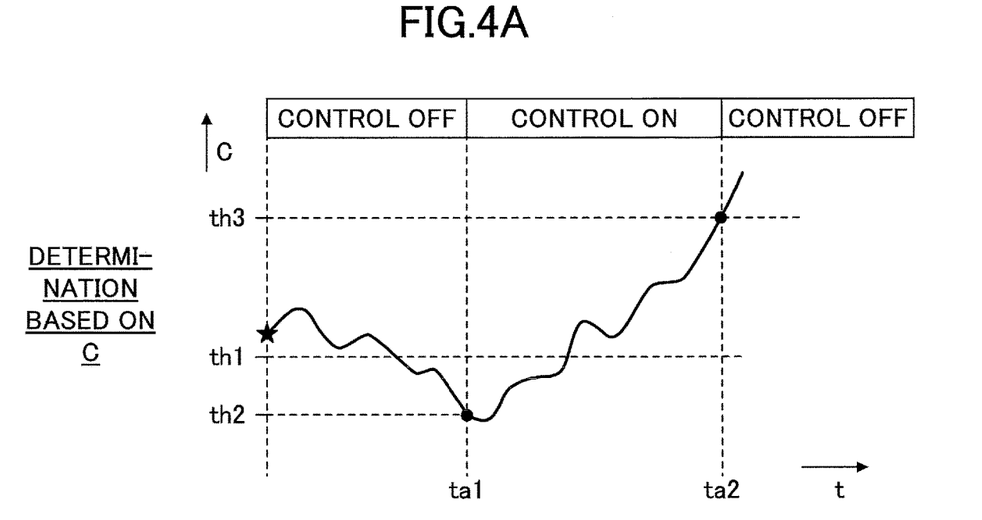
FIG. 4A is an example of an operational timing chart that is implemented when determining whether the charge and discharge of the battery are balanced is to be executed based on the remaining battery capacity C in the charging control device according to the embodiment.
Figure 4B:
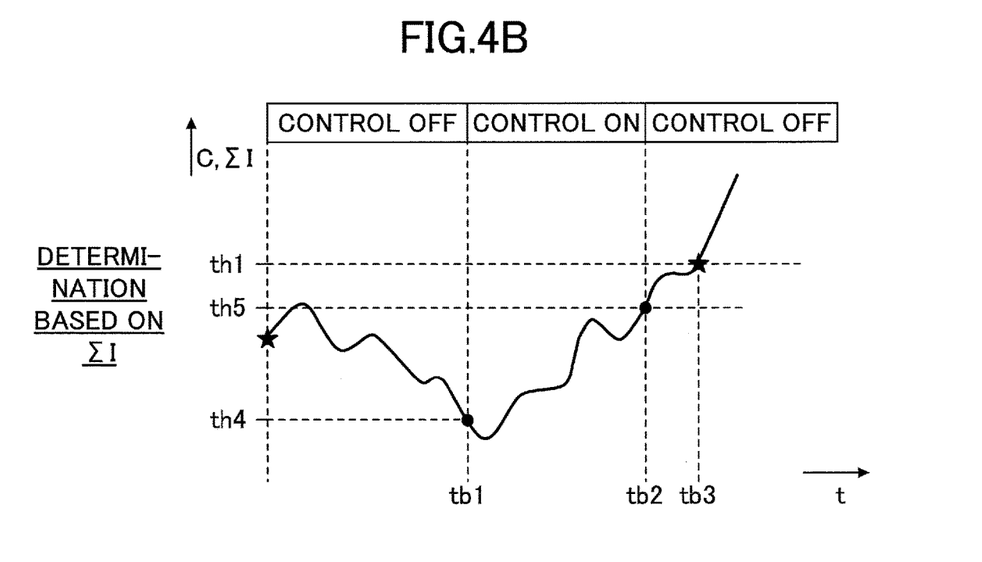
FIG. 4B is an example of an operational timing chart that is implemented when determining whether the charge and discharge of the battery are balanced is to be executed based on the time-accumulated amount of charge and discharge currents $\Sigma I$ in the charging control device according to the embodiment.

Next, with reference to FIG. 3 and FIG. 4, operations of the charging control device 10 in the embodiment will be described. FIG. 3 is an example of a flowchart of a control routine executed by the ECU 22 of the charging control device in the embodiment. Note that execution of the routine illustrated in FIG. 3 starts when the vehicle is started (namely, the engine 14 is started), and ends when the engine 14 is stopped. FIG. 4A is an example of an operational timing chart that is implemented when determining whether the charge and discharge of the battery 12 are balanced is to be executed based on the remaining battery capacity C in the charging control device 10 in the embodiment. Also, FIG. 4B is an example of an operational timing chart that is implemented when determining whether the charge and discharge of the battery 12 are balanced is to be executed based on the time-accumulated amount of charge and discharge currents ΣI in the charging control device 10 in the embodiment.

In the embodiment, the ECU 22 detects the states of the battery 12 at predetermined times after the vehicle has been started. Specifically, the charge/discharge current calculation unit 30 calculates an amount of accumulation ΣI, which is a time-accumulated amount of charge and discharge currents I of the battery 12 detected by using the sensors 20 during a trip after the vehicle has been started, and the absolute charged state calculation unit 32 calculates the remaining battery capacity C of the battery 12.

Also, after having detected the states of the battery 12 as described above, the ECU 22 determines whether it is necessary to execute the charge control of the battery 12, based on the states of the battery. Specifically, first, based on the remaining battery capacity C calculated by the absolute charged state calculation unit 32, the determination condition selection unit 34 selects a condition used for determining whether the charge and discharge of the battery 12 are balanced. This condition used for determining whether the charge and discharge of the battery 12 are balanced is selected among (1) a condition based on the remaining battery capacity C calculated by the absolute charged state calculation unit 32, and (2) a condition based on the time-accumulated amount of charge and discharge currents ΣI calculated by the charge/discharge current calculation unit 30 during the trip. Then, following the condition selected by the determination condition selection unit 34, the charge-discharge balance determination unit 36 determines whether the charge and discharge of the battery 12 are balanced.

In other words, for determining whether the charge and discharge of the battery 12 are balanced, the determination condition selection unit 34 first determines whether a state has been satisfied even once during the trip in which the remaining battery capacity C calculated by the absolute charged state calculation unit 32 is greater than or equal to a first threshold th1 (Step 100). Note that this first threshold th1 is a remaining capacity of the battery to switch between the condition (1) based on the remaining battery capacity C calculated by the absolute charged state calculation unit 32, and the condition (2) based on the time-accumulated amount of charge and discharge currents ΣI calculated by the charge/discharge current calculation unit 30 during the trip, for determining whether the charge and discharge of the battery 12 are balanced, which is set in advance to a remaining capacity of the battery, for example, 85% or the like with respect to the fully charged state.

If determining that a state has been satisfied even once during the trip in which the remaining battery capacity C calculated by the absolute charged state calculation unit 32 is greater than or equal to the first threshold th1 (positive determination at Step 100), the determination condition selection unit 34 selects the condition (1) based on the remaining battery capacity C calculated by the absolute charged state calculation unit 32, for determining whether the charge and discharge are balanced. On the other hand, if determining that a state has never been satisfied during the trip in which the remaining battery capacity C calculated by the absolute charged state calculation unit 32 is greater than or equal to the first threshold th1 (negative determination at Step 100), the determination condition selection unit 34 selects the condition (2) based on the time-accumulated amount of charge and discharge currents ΣI calculated by the charge/discharge current calculation unit 30 during the trip.

If the condition based on the remaining battery capacity C is selected by the determination condition selection unit 34 for determining whether the charge and discharge are balanced, then, the charge-discharge balance determination unit 36 determines whether the remaining battery capacity C calculated by the absolute charged state calculation unit 32 is less than a second threshold th2 (Step 102). Note that this second threshold th2 is a lower-limit threshold that is necessary to determine whether the charge and discharge of the battery 12 are balanced by using the remaining battery capacity C, for starting the charge control, which is set in advance to a value less than the first threshold (for example, 80% or the like with respect to the fully charged state).

If determining at Step 102 that C<th2 is satisfied, namely, if the remaining battery capacity C of the battery 12 is greater than or equal to the first threshold th1 and less than the second threshold th2, the charge-discharge balance determination unit 36 determines the charge and discharge have become imbalanced due to excessive discharge, and has the power control unit 38 execute the charge control. In this case, the power control unit 38 issues a command to increase the rotational speed to the engine 14, or a command to raise the power generation voltage to the alternator 16, so as to execute the charge control to charge the battery (Step 104).

On the other hand, if determining at Step 102 that C<th2 is not satisfied, then, the charge-discharge balance determination unit 36 determines whether the remaining battery capacity C is greater than or equal to a third threshold th3 (Step 106). Note that this third threshold th3 is an upper-limit threshold that is necessary to determine whether the charge and discharge of the battery 12 are balanced by using the remaining battery capacity C, for stopping the charge control, which is set in advance to a value greater than the first threshold (for example, 90% or the like with respect to the fully charged state).

If determining at Step 106 that C≥th3 is not satisfied, the charge-discharge balance determination unit 36 continues to have the power control unit 38 execute the charge control thereafter. On the other hand, if determining at Step 106 that C≥th3 is satisfied, the charge-discharge balance determination unit 36 determines that the remaining capacity of the battery 12 has been recovered, and has the power control unit 38 stop executing the charge control. In this case, the power control unit 38 issues a command to decrease the rotational speed by the increased amount to resume a normal value to the engine 14, or a command to decrease the power generation voltage by the increased amount to resume a normal value to the alternator 16, so as to stop executing the charge control (Step 108).

Also, if the condition based on the time-accumulated amount of charge and discharge currents ΣI during the trip is selected by the determination condition selection unit 34 for determining whether the charge and discharge are balanced, then, the charge-discharge balance determination unit 36 determines whether the time-accumulated amount of charge and discharge currents ΣI during the trip calculated by the charge/discharge current calculation unit 30 is less than a fourth threshold th4 (namely, on the discharged side with respect to the fourth threshold th4) (Step 110).

Note that the fourth threshold th4 is a lower-limit threshold that is necessary to determine whether the charge and discharge of the battery 12 are balanced by using the time-accumulated amount of charge and discharge currents ΣI during the trip, for starting the charge control, which is set in advance on the discharged side with respect to the zero value of the charge and discharge currents. Also, this fourth threshold th4 may be changed depending on the magnitude of the remaining battery capacity C when the vehicle is started, namely, when a trip is started, for example, may be set to the closer value on the discharged side to the zero value of the charge and discharge current if the remaining battery capacity C is less than the first threshold th1. This is because the less the remaining battery capacity C is when the vehicle is started, the less the amount of discharge currents of the battery 12 is for determining that the charge and discharge of the battery 12 is imbalanced.

If determining at Step 110 that ΣI<th4 is satisfied, namely, if the time-accumulated amount of charge and discharge currents ΣI of the battery 12 is less than the fourth threshold th4 on the discharged side, the charge-discharge balance determination unit 36 determines that the charge and discharge have become imbalanced due to excessive discharge, and has the power control unit 38 execute the charge control. In this case, the power control unit 38 issues a command to increase the rotational speed to the engine 14, or a command to raise the power generation voltage to the alternator 16, so as to execute the charge control to charge the battery (Step 112).

On the other hand, if determining at Step 110 that ΣI<th4 is not satisfied, then, the charge-discharge balance determination unit 36 determines whether the time-accumulated amount of charge and discharge currents ΣI is greater than or equal to a fifth threshold th5 (namely, on the charged side with respect to the fifth threshold th5) (Step 114).

Note that the fifth threshold th5 is an upper-limit threshold that is necessary to determine whether the charge and discharge of the battery 12 are balanced by using the time-accumulated amount of charge and discharge currents ΣI during a trip, for stopping the charge control, which is set in advance on the charged side with respect to the fourth threshold th4. Also, this fifth threshold th5 may be changed depending on the magnitude of the remaining battery capacity C when the vehicle is started, namely, when the trip is started. Further, the fifth threshold th5 may be linked to the fourth threshold t4 so that the difference from the fourth threshold th4 always takes the same value in terms of the time-accumulated amount ΣI.

If determining at Step 114 that ΣI≥th5 is not satisfied, the charge-discharge balance determination unit 36 continues to have the power control unit 38 execute the charge control thereafter. On the other hand, if determining at Step 114 that ΣI≥th5 is satisfied, the charge-discharge balance determination unit 36 determines that the remaining capacity of the battery 12 has been recovered, and has the power control unit 38 stop executing the charge control. In this case, the power control unit 38 issues a command to decrease the rotational speed by the increased amount to resume a normal value to the engine 14, or a command to decrease the power generation voltage by the increased amount to resume a normal value to the alternator 16, so as to stop executing the charge control (Step 116).

If having started executing the charge control at Step 104 or 112, having stopped executing the charge control at Step 108 or 116, determining at Step 106 that C≥th3 is not satisfied, at Step 114 that ΣI≥th5 is not satisfied, then, the ECU 22 determines whether the engine 14 has been stopped (Step 118). Consequently, if determining that the engine 14 continues to operate, the ECU 22 thereafter continues to execute Steps 100 and after. On the other hand, if determining that the engine 14 has been stopped, then, the ECU 22 ends the current routine without executing the steps further.

In this way, in the embodiment, after the vehicle has been started, if the remaining battery capacity C of the battery 12 has become greater than or equal to the first threshold th1, namely, if a state has been satisfied even once during the trip in which the remaining battery capacity C is greater than or equal to the first threshold th1, then, the charging control device 10 determines whether the charge and discharge of the battery 12 are balanced based on the remaining battery capacity C. Then, if the remaining battery capacity C transitions from the state being greater than or equal to the first threshold th1, to a state being less than the second threshold th2 (time ta1 in FIG. 4A), the charging control device 10 determines that the charge and discharge of the battery 12 have become imbalanced due to excessive discharge, and starts the charge control to recover the remaining capacity of the battery 12. This charge control will be continued until the battery capacitance C reaches the third threshold th3, and will be stopped if the battery capacitance C becomes greater than or equal to the third threshold th3 (time ta2 in FIG. 4A).

Also, after the vehicle has been started, if the remaining battery capacity C of the battery 12 has never become greater than or equal to the first threshold th1 (namely, has been kept below the first threshold th1), namely, if a state has never been satisfied during the trip in which the remaining battery capacity C of the battery 12 is greater than or equal to the first threshold th1, determining whether the charge and discharge of the battery 12 are balanced during the trip is executed based on the time-accumulated amount of charge and discharge currents ΣI. Then, if the time-accumulated amount of charge and discharge currents ΣI of the battery 12 becomes less than the fourth threshold th4 on the discharged side (time tb1 in FIG. 4B), the charging control device 10 determines that the charge and discharge of the battery 12 have become imbalanced due to excessive discharge, and starts the charge control to recover the remaining capacity of the battery 12. This charge control is continued until the time-accumulated amount of charge and discharge currents ΣI reaches the fifth threshold th5, and stopped when it becomes greater than or equal to the fifth threshold th5 (time tb2 in FIG. 4B).

Configured as such, if the remaining battery capacity C never becomes greater than or equal to the first threshold th1 during the trip after the vehicle has been started, and even if the remaining battery capacity C becomes less than the second threshold th2, which is less than the first threshold th1, it is determined that the charge and discharge of the battery 12 is balanced as long as the time-accumulated amount ΣI stays on the charged side with respect to the fourth threshold th4 set on the discharged side with respect to the zero value of charge and discharge currents, and execution of the charge control can be inhibited.

Therefore, according to the embodiment, the charge control is not executed uniformly just because the remaining capacity of the battery is less than the second threshold th2; the charge control is not executed when the charge and discharge of the battery 12 are balanced relatively or in a short-term. When the charge and discharge of the battery 12 are balanced relatively or in a short-term, charging the battery 12 is not required even if the remaining battery capacity C is low. In this regard, according to the embodiment, when the charge and discharge of the battery 12 are balanced relatively or in a short-term, it is possible to reduce chances in that the engine 14 is put in a high load state due to execution of the charge control, and hence, it is possible to avoid reducing the effect of improving the vehicle fuel efficiency by the charge control. Namely, when the charge and discharge of the battery 12 are balanced, it is possible to prevent the charge control from being executed ineffectively, and to avoid reducing the effect of improving the vehicle fuel efficiency by the charge control.

Also, after the charging control device 10 in the embodiment starts the charge control when the time-accumulated amount of charge and discharge currents ΣI during the trip has become less than the fourth threshold th4, and then, if the battery capacity C becomes greater than or equal to the first threshold th1 (time tb3 in FIG. 4B), determining whether the charge and discharge of the battery 12 are balanced is switched from a state of execution based on the time-accumulated amount of charge and discharge currents ΣI, to a state of execution based on the remaining battery capacity C.

Note here that when a long time passes after the vehicle has been started, the error is accumulated for the time-accumulated amount of charge and discharge currents ΣI detected by the sensors 20. Therefore, the relative charged state of the battery 12 may not be detected precisely. In this regard, a method of charge control always based on the time-accumulated amount of charge and discharge currents ΣI of the battery 12 needs to correct the time-accumulated amount ΣI periodically to grasp a precise charged state of the battery 12. However, if such correction is required for the time-accumulated amount ΣI, execution of the charge control needs to be inhibited at least for the correction period, and hence, the effect of improving the vehicle fuel efficiency may be restricted.

In contrast to this, by the configuration in the embodiment, determining whether the charge and discharge of the battery 12 are balanced, and the charge control are not always executed based on the time-accumulated amount of charge and discharge currents ΣI during a trip. Even if the determination of the balance and the charge control are started once based on the time-accumulated amount ΣI, if the battery capacity C changes from a state being less than the first threshold th1 to a state being greater than or equal to the first threshold th1, then, determining whether the charge and discharge of the battery 12 are balanced, and the charge control are executed based on the battery capacity C thereafter.

Therefore, according to the embodiment, periodic correction is not required for the time-accumulated amount of charge and discharge currents ΣI during a trip calculated by the charge/discharge current calculation unit 30 for determining whether the charge and discharge of the battery 12 are balanced and the charge control, and a correction period does not need to be provided to correct the time-accumulated amount of charge and discharge currents ΣI during a trip. In this regard, according to the embodiment, it is possible to avoid providing a period for inhibiting execution of the charge control, required for correcting the time-accumulated amount of charge and discharge currents ΣI during a trip. Therefore, it is possible to avoid restricting the effect of improving the vehicle fuel efficiency by the charge control, and the effect of making the life of the battery 12 longer.

Thus, the charging control device 10 in the embodiment can precisely determine whether the charge and discharge of the battery 12 are balanced, and can execute the charge control appropriately without reducing the effects brought by the charge control.

Note that in the above embodiment, the absolute charged state calculation unit 32 of the ECU 22 corresponds to a "charged state calculation unit" described in the claims; the charge/discharge current calculation unit 30 corresponds to an "accumulated charge and discharge calculation unit" described in the claims; the determination condition selection unit 34 and the charge-discharge balance determination unit 36 correspond to an "execution determination unit" described in the claims; the power control unit 38 corresponds to a "charge control unit" described in the claims.

Also, in the above embodiment, the first threshold th1 corresponds to a "first threshold" described in the claims; the second threshold th2 corresponds to a "second threshold" described in the claims; the fourth threshold th4 corresponds to a "third threshold" described in the claims; the third threshold th3 corresponds to a "fourth threshold" described in the claims; and the fifth threshold th5 corresponds to a "fifth threshold" described in the claims.

Furthermore, in the above embodiment, the charge-discharge balance determination unit 36 determining that the charge control needs to be executed due to the charge and discharge becoming imbalanced due to excessive discharge after having determined that C<th2 is satisfied at Step 102 in the routine illustrated in FIG. 3, corresponds to a "first determination unit" described in the claims; and the charge-discharge balance determination unit 36 determining that the charge control needs to be executed due to the charge and discharge becoming imbalanced due to excessive discharge after having determined that ΣI<th4 is satisfied at Step 110, corresponds to a "second determination unit" described in the claims.

Incidentally, in the above embodiment, it is determined whether a state has been satisfied even once during a trip in which the remaining battery capacity C calculated by the absolute charged state calculation unit 32 is greater than or equal to the first threshold th1, and depending on a determination result, selection of the condition for determining whether the charge and discharge are balanced is switched between the condition based on the remaining battery capacity C, and the condition based on the time-accumulated amount of charge and discharge currents ΣI. Specifically, if a state has been satisfied even once during the trip in which the remaining battery capacity C calculated by the absolute charged state calculation unit 32 is greater than or equal to the first threshold th1, the condition based on the remaining battery capacity C is selected continuously thereafter for determining whether the charge and discharge are balanced; on the other hand, if a state has never been satisfied during the trip in which the remaining battery capacity C of the battery 12 is greater than or equal to the first threshold th1, the condition based on the time-accumulated amount of charge and discharge currents ΣI is selected for determining whether the charge and discharge are balanced.

However, the present invention is not limited to that. For example, it is possible to first determine whether the remaining battery capacity C calculated by the absolute charged state calculation unit 32 is less than the first threshold th1, and then, only if the remaining battery capacity C is less than the first threshold th1, to determine whether the charge and discharge are balanced based on the time-accumulated amount of charge and discharge currents ΣI, and then, if the charge and discharge have become imbalanced due to excessive discharge, to execute the charge control. In this modified example, the charge control is also not executed uniformly just because the remaining capacity of the battery is less than the second threshold th2; the charge control is not executed when the charge and discharge of the battery 12 are balanced relatively or in a short-term. Therefore, substantially the same effect can be obtained as in the above embodiment.

Also, it is possible to first determine whether the remaining battery capacity C calculated by the absolute charged state calculation unit 32 is less than the first threshold th1, and then, as a determination result, if the remaining battery capacity C is less than the first threshold th1, to determine whether the time-accumulated amount of charge and discharge currents ΣI is less than the fourth threshold th4 thereafter, and then, not to start execution of the charge control as long as ΣI≥th4 is satisfied as a determination result; or to start execution of the charge control if ΣI<th4 is satisfied. In this modified example, the charge control is also not executed uniformly just because the remaining capacity of the battery is less than the second threshold th2; the charge control is not executed when the charge and discharge of the battery 12 are balanced relatively or in a short-term. Therefore, substantially the same effect can be obtained as in the above embodiment.

Also, in the above embodiment, as the sensors 20 to detect the states of the battery 12, the battery current sensor to output a signal that corresponds to the battery current I, the battery voltage sensor to output a signal that corresponds to the battery voltage V, and the battery temperature sensor to output a signal that corresponds to the battery temperature T are used. However, the present invention is not limited to those, but instead of or in addition to those sensors, a sensor that can calculate the state of charge (SOC) of the battery 12 may be used. In this case, the ECU 22 may include a measurement unit to detect the remaining capacity based on a signal from the sensor that calculates the state of charge (SOC) of the battery 12, and may not include the absolute charged state calculation unit 32 to calculate the remaining battery capacity C, based on the charge and discharge current I, the battery voltage V, and the battery temperature T of the battery 12.

Also, in the above embodiment, the battery voltage V of the battery 12 is detected by a battery voltage sensor that outputs a signal corresponding to the voltage V between both terminals of the battery 12. However, the present invention is not limited to that, but the battery voltage V may be calculated by using the current value of the battery current I by the battery current sensor, and the resistance value of a shunt resistor.

The present international application is based on and claims the benefit of Japanese Priority Application No. 2014-030059, filed on Feb. 19, 2014, the entire contents of which are hereby incorporated by reference.

DESCRIPTION OF REFERENCE SYMBOLS 10 charging control device
12 battery
14 engine
16 alternator
20 sensor
22 ECU (Electronic Control Unit)

The invention claimed is:

1. A charging control device, comprising:
a charged state calculation unit configured to calculate a remaining capacity of a battery that can be charged and discharged, based on a signal from a sensor to detect a state of the battery;
an accumulated charge and discharge calculation unit configured to calculate an accumulated amount of charge and discharge of the battery after an activation of the battery, based on the signal from the sensor;
an execution determination unit configured, in a case where the remaining capacity calculated by the charged state calculation unit is less than a first threshold, to determine whether to execute charge control to recover the remaining capacity of the battery, based on the accumulated amount calculated by the accumulated charge and discharge calculation unit, or in a case where the remaining capacity calculated by the charged state calculation unit is greater than or equal to the first threshold, to determine whether to execute charge control to recover the remaining capacity of the battery, based on the remaining capacity; and
a charge control unit configured to execute the charge control following a determination result by the execution determination unit.

2. The charging control device as claimed in claim 1, wherein
instead of, in a case where the remaining capacity calculated by the charged state calculation unit is less than the first threshold, determining whether to execute charge control to recover the remaining capacity of the battery, based on the accumulated amount calculated by the accumulated charge and discharge calculation unit, or in a case where the remaining capacity calculated by the charged state calculation unit is greater than or equal to the first threshold, determining whether to execute charge control to recover the remaining capacity of the battery, based on the remaining capacity, the execution determination unit determines whether to execute the charge control based on the remaining capacity in a case where a state representing that the remaining capacity calculated by the charged state calculation unit is greater than or equal to the first threshold, has been satisfied even once after the activation of the battery, or determines whether to execute the charge control based on the accumulated amount calculated by the accumulated charge and discharge calculation unit in a case where the state representing that the remaining capacity calculated by the charged state calculation unit is greater than or equal to the first threshold, has never been satisfied.

3. The charging control device as claimed in claim 2, wherein the execution determination unit includes
a first determination unit configured to determine that the charge control needs to be executed in a case where the remaining capacity calculated by the charged state calculation unit is less than a second threshold being less than the first threshold; and
a second determination unit configured to determine that the charge control needs to be executed in a case where the accumulated amount calculated by the accumulated charge and discharge calculation unit is less than a third threshold set on a discharge side.

4. The charging control device as claimed in claim 3, wherein
after having started executing the charge control, the charge control unit stops executing the charge control in a case where the remaining capacity calculated by the charged state calculation unit reaches a fourth threshold being greater than the second threshold, or the accumulated amount calculated by the accumulated charge and discharge calculation unit reaches a fifth threshold being greater than the third threshold.

5. The charging control device as claimed in claim 1, wherein
the execution determination unit determines that the charge control does not need to be executed in a case where charge and discharge of the battery are balanced, and determines that the charge control needs to be executed in a case where the charge and discharge of the battery are imbalanced to be excessively discharged.

6. The charging control device as claimed in claim 2, wherein
the execution determination unit determines that the charge control does not need to be executed in a case where charge and discharge of the battery are balanced, and determines that the charge control needs to be executed in a case where the charge and discharge of the battery are imbalanced to be excessively discharged.

7. The charging control device as claimed in claim 3, wherein
the execution determination unit determines that the charge control does not need to be executed in a case where charge and discharge of the battery are balanced, and determines that the charge control needs to be executed in a case where the charge and discharge of the battery are imbalanced to be excessively discharged.

8. The charging control device as claimed in claim 4, wherein
the execution determination unit determines that the charge control does not need to be executed in a case where charge and discharge of the battery are balanced, and determines that the charge control needs to be executed in a case where the charge and discharge of the battery are imbalanced to be excessively discharged.

* * * * *